US007944925B2

(12) United States Patent
Meier et al.

(10) Patent No.: US 7,944,925 B2
(45) Date of Patent: May 17, 2011

(54) SYSTEM AND METHOD FOR GROUPING MULTIPLE VLANS INTO A SINGLE 802.11 IP MULTICAST DOMAIN

(75) Inventors: Robert Meier, Cuyahoga Falls, OH (US); David Halasz, Stow, OH (US)

(73) Assignee: Cisco Technology, Inc., San Jose, CA (US)

( * ) Notice: Subject to any disclaimer, the term of this patent is extended or adjusted under 35 U.S.C. 154(b) by 867 days.

(21) Appl. No.: 11/840,781

(22) Filed: Aug. 17, 2007

(65) Prior Publication Data
US 2007/0286108 A1    Dec. 13, 2007

Related U.S. Application Data

(63) Continuation of application No. 10/701,851, filed on Nov. 5, 2003, now Pat. No. 7,301,946, which is a continuation-in-part of application No. 09/953,820, filed on Sep. 12, 2001, now Pat. No. 7,251,232.

(60) Provisional application No. 60/252,717, filed on Nov. 22, 2000.

(51) Int. Cl.
    *H04L 12/28* (2006.01)
(52) U.S. Cl. ............... 370/395.1; 370/312; 370/331; 370/390; 370/401; 370/432
(58) Field of Classification Search .......... 370/312, 370/331, 338, 390, 401, 432
    See application file for complete search history.

(56) References Cited

U.S. PATENT DOCUMENTS

| 4,881,263 | A | * | 11/1989 | Herbison et al. | 713/162 |
| 5,276,680 | A | | 1/1994 | Messenger | |
| 5,442,703 | A | * | 8/1995 | Kim et al. | 380/271 |
| 5,621,732 | A | | 4/1997 | Osawa | |
| 5,673,031 | A | | 9/1997 | Meier | |
| 5,737,328 | A | | 4/1998 | Norman et al. | |
| 5,959,989 | A | * | 9/1999 | Gleeson et al. | 370/390 |
| 5,963,556 | A | * | 10/1999 | Varghese et al. | 370/401 |
| 6,002,918 | A | | 12/1999 | Heiman et al. | |
| 6,041,358 | A | * | 3/2000 | Huang et al. | 709/238 |
| 6,049,533 | A | | 4/2000 | Norman et al. | |
| 6,067,297 | A | | 5/2000 | Beach | |

(Continued)

FOREIGN PATENT DOCUMENTS

EP    04784237    10/2007

OTHER PUBLICATIONS

LAN/MAN Standards Committee of the IEEE Computer Society: "IEEE Std. 802.1X-2001: Port-Based Network Access Control" [Online] Jul. 13, 2001, IEEE, USA.

(Continued)

Primary Examiner — Ayaz R Sheikh
Assistant Examiner — Andrew C Lee
(74) Attorney, Agent, or Firm — Tucker Ellis & West LLP

(57) ABSTRACT

A system and method for identifying and grouping multiple virtual local area networks into a single multicast domain is provided. The system and method may be configured to designate a virtual local area network within as a multicast virtual local area network to streamline the delivery of multicast messages via a network. A station may be configured with multiple group keys so that it can receive messages from multiple broadcast or multicast domains.

20 Claims, 2 Drawing Sheets

U.S. PATENT DOCUMENTS

| | | | |
|---|---|---|---|
| 6,085,238 A * | 7/2000 | Yuasa et al. | 709/223 |
| 6,112,251 A * | 8/2000 | Rijhsinghani | 709/249 |
| 6,216,167 B1 * | 4/2001 | Momirov | 709/238 |
| 6,307,837 B1 * | 10/2001 | Ichikawa et al. | 370/230 |
| 6,331,983 B1 * | 12/2001 | Haggerty et al. | 370/400 |
| 6,370,142 B1 * | 4/2002 | Pitcher et al. | 370/390 |
| 6,614,787 B1 * | 9/2003 | Jain et al. | 370/390 |
| 6,633,765 B1 * | 10/2003 | Maggenti | 455/503 |
| 6,647,020 B1 * | 11/2003 | Maher et al. | 370/432 |
| 6,654,371 B1 * | 11/2003 | Dunstan et al. | 370/390 |
| 6,785,294 B1 * | 8/2004 | Ammitzbøll et al. | 370/467 |
| 6,839,348 B2 * | 1/2005 | Tang et al. | 370/390 |
| 6,914,905 B1 * | 7/2005 | Yip et al. | 370/395.53 |
| 6,963,573 B1 * | 11/2005 | Cain et al. | 370/401 |
| 7,310,335 B1 * | 12/2007 | Garcia-Luna-Aceves et al. | 370/390 |
| 2003/0041266 A1 * | 2/2003 | Ke et al. | 713/201 |
| 2003/0165140 A1 * | 9/2003 | Tang et al. | 370/393 |
| 2004/0078566 A1 | 4/2004 | Barber et al. | |
| 2008/0155252 A1 * | 6/2008 | Nambiar | 713/153 |

OTHER PUBLICATIONS

XP-002307525, "IEEE Standard for Local and Metropolitan area networks—Port-Based Network Access Control", LAN/MAN Standards Committee of the IEEE Computer Society, pp. 13-21.

Bernard Aboba, et al., XP-002307526, "IEEE 802.1X for Wireless LANs", Mar. 2000, Slides 1-27.

Maarten Hoeben; "No Wires Needed"; May 10, 2000; IEEE P802.11.

Mathilde Benveniste; "Tiered Contention"; Nov. 2000; IEEE P802.11.

Menzo Wentink; "Probabilistic DCF Versus Backoff DCF"; Nov. 2000; IEEE P802.11.

* cited by examiner

SYSTEM AND METHOD FOR GROUPING MULTIPLE VLANS INTO A SINGLE 802.11 IP MULTICAST DOMAIN

CROSS-REFERENCE TO RELATED APPLICATIONS

This application is a continuation of U.S. patent application Ser. No. 10/701,851 filed on Nov. 5, 2003 now U.S. Pat. No. 7,301,946, which is a Continuation-in-Part (CIP) of U.S. patent application Ser. No. 09/953,820 filed on Sep. 12, 2001 now U.S. Pat. No. 7,251,232, which claims the benefit of U.S. Provisional Application No. 60/252,717 filed Nov. 22, 2000.

TECHNICAL FIELD

This application is generally directed to wireless networking and processing of multicast data.

BACKGROUND

The IEEE (Institute of Electrical and Electronic Engineers) 802.11 standards provide guidelines for allowing users to wirelessly connect to a network and access basic services provided therein. As well, IEEE 802.11 standards provide guidelines for multicast transmissions sent via the wireless network.

The IEEE 802 standards also provide protocol directed toward the use of virtual local area networks or virtual LAN's (VLANs) in wireless networks. Virtual networking refers to the ability of switches and routers to configure logical topologies on top of the physical network infrastructure allowing any arbitrary collection of LAN segments within a network to be combined into an autonomous user group, appearing as a single local area network (LAN).

VLANs offer significant benefits in terms of efficient use of bandwidth, flexibility, performance, and security. VLAN technology functions by logically segmenting the network into different "broadcast domains" whereby packets are only switched between ports that are designated for the same VLAN. Thus, by containing traffic originating on a particular LAN only to other LAN's within the same VLAN, switched virtual networks avoid wasting bandwidth. Conventionally, this is a drawback inherent in traditional bridged/switched networks where packets are often forwarded to LAN's that do not require them.

The VLAN approach also improves scalability, particularly in LAN environments that support broadcast- or multicast-intensive protocols as well as other applications that flood packets throughout the network.

The Internet Engineering Task Force (IETF) has published an Internet Group Management Protocol (IGMP) standard, which defines a method for organizing IP nodes into an IP multicast group. An IP multicast group is identified by an IP multicast address. An IP node joins an IP multicast group by transmitting an IGMP Membership Report on its local subnet. When an IP Multicast Router receives an IP multicast packet, it only forwards the packet onto other subnets where there are members of the IP multicast group identified by the destination IP multicast address.

Conventionally, the 802.11 standard for wireless networks presumes support for a single group key (e.g. VLAN) for a client. An 802.11i-compliant AP may be configured to send a Group Key to an 802.11i station. This Group Key is conventionally sent in an EAPOL Key message in accordance with the IEEE standards.

Additionally, the EAPOL Key message may contain an integer Key ID, which identifies the Group Key. An 802.11i transmitter enters the Key ID of the key used to encrypt a transmitted 802.11 multicast frame into a Key ID field in the 802.11 frame header. The 802.11 receiver uses the Key ID to select the correct key to decrypt the multicast frame.

In accordance with traditional methods, "Layer 2 Broadcast Domain" architecture may be configured to correspond to a single Internet Protocol (IP) subnet or VLAN. An IP Multicast Domain may be configured to span multiple subnets. Therefore, Ethernet and 802.11 stations on multiple VLANs may be members of the same multicast group.

An 802.11 access point (AP) may be connected to an Ethernet LAN on a VLAN trunk link whereby each VLAN enabled on an AP Ethernet link may correspond to an 802.11 broadcast domain. In traditional systems, an AP is configured to use a different set of 802.11 broadcast encryption keys for each 802.11 broadcast domain. These broadcast domain specific encryption keys prohibit 802.11 stations in a first broadcast domain from receiving broadcast frames transmitted on a second broadcast domain.

Currently, there is not a distinction between such a VLAN-based broadcast domain and an IP Multicast Domain. Therefore, an AP will often receive multiple copies of the same IP multicast packet on its Ethernet link (e.g. one copy for each VLAN where the respective multicast group is active). Accordingly, an AP will often transmit multiple copies of the same IP multicast packet to associated 802.11 stations.

Redundant multicast transmissions are problematic on 802.11 links. Useless multicast transmissions may excessively consume bandwidth. If simple rate-limiting (e.g. as in the current AP350 implementation) is used to control the amount of bandwidth used for multicast transmissions, both useful and useless multicast frames may be discarded.

An additional problem associated with traditional methods is that if there is a single power-save station associated to an AP, all multicast frames are buffered and transmitted immediately following an 802.11 beacon. Accordingly, higher-priority Quality-of-Service (QoS) unicast transmissions may be delayed for the duration of the multicast delivery period. Power-save stations must stay awake, for the duration of the multicast delivery period, to receive multicast transmissions; therefore, multicast transmissions can reduce battery life in power-save stations.

SUMMARY EXAMPLE EMBODIMENTS

Disclosed herein, in one example embodiment is a system and method for organizing virtual local area networks (VLANs) corresponding to a wireless network (e.g. IEEE 802.11). In an example embodiment the present system and method may be configured to identify a plurality of virtual local area networks on a network. A switch may be programmed to effectuate the identification of the virtual local area networks. Once identified, the system may be suitably configured to group the identified virtual local area networks into a multicast domain on the network.

The system may be configured to designate one virtual local area network as the multicast virtual local area network of the multicast domain for receiving and transmitting a multicast message. Further, the system may assign an associated station to the multicast domain whereby the station's respective virtual local area network is included in the multicast domain.

An access point intercepts any IGMP Membership Report transmitted by the wireless station. The access point relays the Membership Report onto the designated multicast VLAN for the wireless station's multicast domain. Therefore, IP multicast routers will forward packets for the corresponding IP multicast stream onto the designated multicast VLAN.

The IP multicast packet will be received by an access point connected to the multicast virtual local area network. The multicast message may be transmitted by the access point to the associated station on the station's multicast domain. An access point may discard multicast packets, which are received on a VLAN that is not associated with the designated multicast VLAN.

In accordance with example embodiments presented herein, the system may be configured to establish a multicast key for signing and encrypting the multicast message transmitted on the network. Additionally, a multicast key identification element corresponding to the multicast key may be established. This multicast key identification element may assist a recipient of the multicast message to select the appropriate multicast key to decrypt the received multicast message. Prior to transmission, the multicast key identification element may be added to a header of a multicast message transmitted to a station.

Likewise, the system may be configured to establish a broadcast key for signing and encrypting a broadcast message transmitted on the network. Additionally, a broadcast key identification element corresponding to the broadcast key may be established. This broadcast key identification element may assist a recipient of a broadcast message to select the appropriate broadcast key to decrypt the broadcast message. Prior to transmission, the broadcast key identification element may be added to the header of a broadcast message transmitted to a station.

In another embodiment, the system may determine if the multicast message must be received by stations in the multicast domain. A message must be received by stations in the multicast domain if there is at least one station that is participating in the multicast group identified by the message's destination multicast address. If the message does not need to be received by stations in the multicast domain, the system may discard the multicast message.

DETAILED DESCRIPTION OF THE INVENTION

The following includes examples of various embodiments and/or forms of components that fall within the scope of the present system that may be used for implementation. Of course, the examples are not intended to be limiting and other embodiments may be implemented without departing from the spirit and scope of the appended claims.

The Institute of Electrical and Electronic Engineers (IEEE) 802.11 standard for wireless networks provides guidelines for allowing users to wirelessly connect to a network and access basic services provided therein. Additionally, the IEEE 802.11 standard provides guidelines and protocol directed to unicast and multicast transmissions. Unless otherwise defined herein, the terms in the present specification should be interpreted as defined, or as customarily used, in the IEEE 802.11 standards and corresponding drafts and revisions thereof.

Briefly describing one embodiment of the present system, it provides for an is 802.11 network and corresponding protocol suitably configured to group multiple VLANs into a single 802.11 multicast domain whereby a single multicast message may be sent to the subscribers of the multicast domain.

In accordance with one embodiment of the present system and method, it will be appreciated that unique multicast and broadcast encryption keys may be established in the same manner as encryption keys are presently generated in accordance with the IEEE 802.11 standard. Of course, it will be appreciated that any methods and encryption techniques may be used to establish the keys utilized for multicast transmission in accordance with the present system and method. As well, it will be appreciated that the security of the encryption keys contemplated by the present innovation may also be protected by verifications in accordance with the IEEE 802.11 standard (e.g. message integrity code).

One embodiment of the disclosed system and method set forth infers the establishment of a trust relationship between an access point (AP) and a defined multicast group of clients or stations. The following embodiments will be described directed toward an AP as the transmitter and wireless clients (PCs) as the receivers of a multicast transmission in an 802.11 network.

Figure 1:
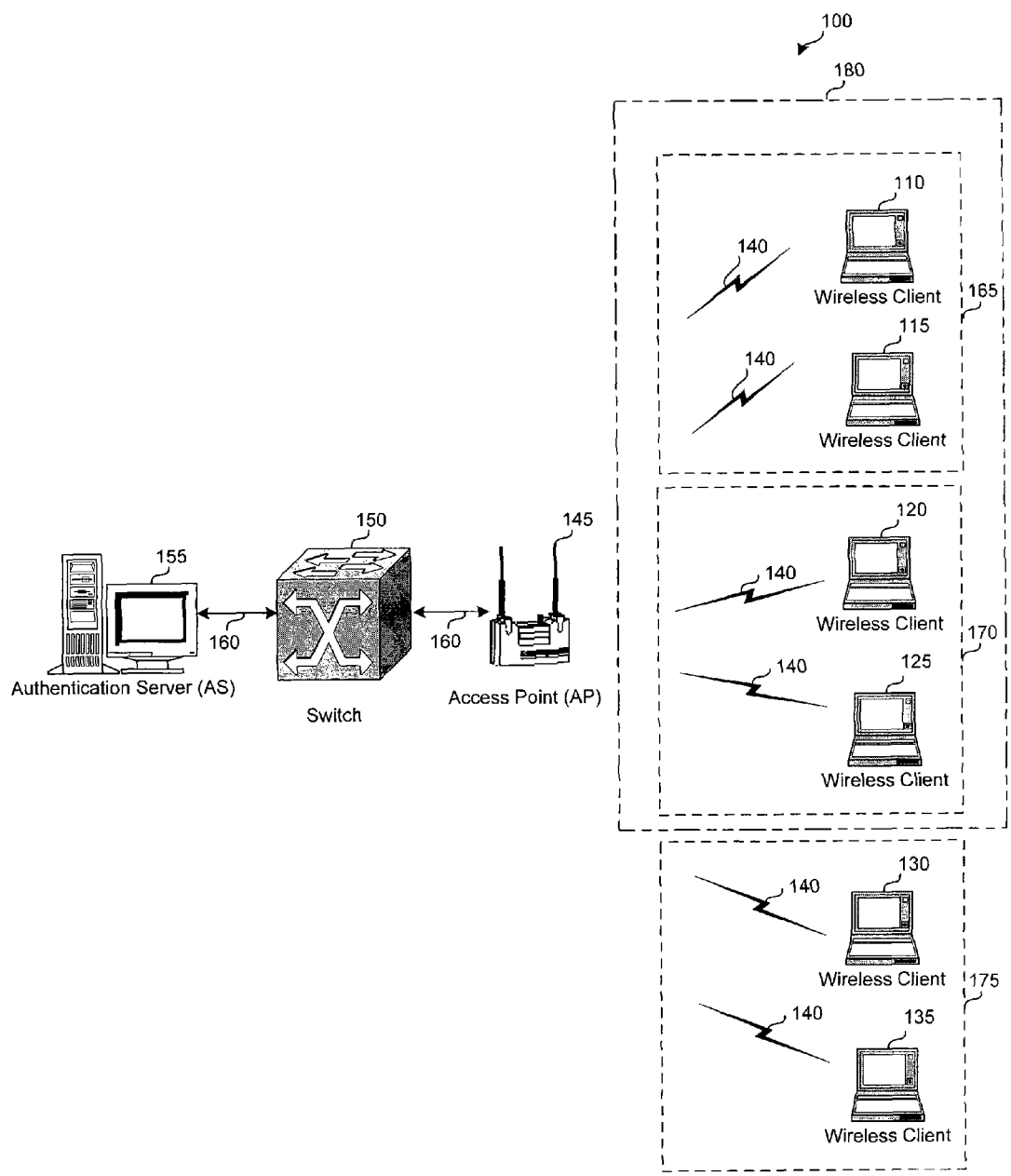
FIG. 1 illustrates a network block diagram that operates to facilitate multicast transmission to a number of wireless clients associated with multiple VLANs in accordance with an example embodiment.

Illustrated in FIG. 1 is a simplified system component diagram of one embodiment of the present system 100. The system components shown in FIG. 1 generally represent the system 100 and may have any desired configuration included within any system architecture.

Referring now to FIG. 1, an embodiment of the system 100 generally includes wireless clients 110, 115, 120, 125, 130, 135 suitably configured and connected to access services and receive multicast transmission on an 802.11 network 140 via an access point (AP) 145. It will be appreciated that the wireless clients 110, 115, 120, 125, 130, 135 may be any component capable of transmitting and/or receiving data packets via a wireless network such as any one of numerous wireless devices, including, but not limited to, a laptop/notebook portable computer (as shown) having a Cardbus network adapter suitable for wireless communication with a wired network, an electronic tablet having a suitable wireless network adapter, a handheld device or personal digital assistant containing a suitable wireless network adapter for communicating to a wired network or the like.

Continued reference to FIG. 1 illustrates that an embodiment of the present system and method may further include a switch 150 and an authentication server (AS) 155. In a basic IEEE 802.11 implementation and the embodiment, a switch 150 may operate to provide interconnectivity between a plurality of network devices disposed on a wired network 160 and optionally between a plurality of local area networks and AP's (not shown).

Additionally, the switch 150 may be suitably capable to identify and configure VLANs. In other words, the switch 150 may be suitably capable to configure virtual logical topologies on top of the physical network infrastructure allowing multiple logical subnets, and the corresponding broadcast domains, to exist on top of the single physical wired network 160.

An AS 155 may be disposed on the wired network 160 to provide authentication services to those network entities requiring such a service. Of course, it will be appreciated that the AS 155 and corresponding functionality may be employed as a stand alone component or combined within another existing component. For example, the functionality of the AS 155 may be included within the switch 150 or the AP 145.

As illustrated in FIG. 1, an AP 145 may be configured to provide the communicative transition point between the dedicated wired network 160 and the wireless clients 110, 115, 120, 125, 130, 135. In accordance with the present system and method, it will be appreciated that the AP 145 may be configured to encrypt a multicast group cipher suite utilizing any one of a number of conventional algorithms known in the art.

In the example embodiment, individually defined VLANs 165, 170, 175 may be configured to group wireless clients 110, 115, 120, 125, 130, 135. As shown, a first VLAN1 165 may virtually include multiple wireless clients 110, 115. Likewise, a second VLAN2 170 may virtually include multiple wireless clients 120, 125. And finally, a third VLAN3 175 may virtually include multiple wireless clients 130, 135.

Although FIG. 1 illustrates a specific number of VLANs (165, 170, 175) operatively configured to communicate to AP 145, it will be appreciated that a system may be defined to include any number of VLANs configured to receive multicast or broadcast transmission from a single AP. It will further be appreciated that the VLANs defined by a network may include any number of wireless clients.

In operation, the switch 150 functioning in accordance with an AP administrator may be suitably configured to group multiple VLANs (e.g. 165, 170) into a single IP Multicast Domain 180. As shown in FIG. 1, the IP Multicast Domain 180 may be configured to include any number of the predefined VLANs. For example, IP Multicast Domain 180 may be configured to include VLAN1 165 and VLAN2 170 as shown.

Next, the AP administrator may arbitrarily select a single VLAN, from the set of VLANs enabled on the AP (165, 170, 175), to function as the Multicast VLAN for the domain. Accordingly, for example, VLAN1 165 may be arbitrarily selected to be advantageously configured to perform as the Multicast VLAN corresponding to the Multicast Domain 180. Of course, selection of the Multicast VLAN may be arbitrary or user-defined without departing from the scope of the present innovation. In one embodiment, a different multicast VLAN may be designated for each Multicast Domain in an AP. In another embodiment, a single VLAN may be the designated VLAN for multiple Multicast Domains.

Next, the parent AP 145 may be suitably configured to assign an associated 802.11 station (e.g. 110, 115, 120, 125, 130, 135) to the IP Multicast Domain 180 if the IP Multicast Domain 180 contains the station's predefined VLAN (e.g. the VLAN that is bound to the station's SSID in the parent AP).

For example, because the embodiment defined VLAN1 165 as the Multicast VLAN, wireless clients 110, 115 may be deemed associated with the Multicast Domain 180. Additionally, because VLAN2 170 is included in the defined Multicast Domain 180, the system may be configured to associate the additional multicast wireless clients 120, 125 to the Multicast Domain 180. On the other hand, because the Multicast Domain 180 was not defined to include VLAN3 175, wireless clients 130, 135 would not be assigned to the Multicast Domain 180.

It will be appreciated that 802.11 wireless clients are configured with a Service Set Identifier (SSID). An 802.11 client can associate with an access point that is configured with a matching Service Set Identifier. In another embodiment, a wireless client's Service Set Identifier is used to determine the client's IP Multicast Domain in the parent access point. A wireless client may be bound to a single remote home subnet, or remote home VLAN, even as it roams seamlessly between access points on different subnets. If such a client roams to an access point, which is not connected to its home VLAN at the data link layer, the client may be bound to the local Multicast Domain that corresponds to its SSID in the access point. In that case, IP multicast messages are forwarded to the designated Multicast VLAN for the local Multicast Domain by the IP multicast routing infrastructure. The client may also be bound to a broadcast domain that corresponds to its remote home VLAN. Clients from different remote home VLANs may be bound to the same local Multicast Domain on an AP.

A single broadcast domain or VLAN may be assigned to a Multicast Domain. For example, in FIG. 1, VLAN3 175 may be assigned to a second Multicast Domain. If a Multicast Domain contains a single VLAN and that single VLAN is also the designated Multicast VLAN, then it will be appreciated that a single group key can function both as a broadcast group key and as a multicast group key.

Continuing with the embodiment, in operation, a parent AP 145 may be configured to intercept internet group multicast protocol (IGMP) reports from the associated 802.11 stations (110, 115, 120, 125), and relay the IGMP reports onto the selected Multicast VLAN 165 for the station's IP Multicast Domain 180. It will be appreciated that IGMP reports are used to establish group membership to an IP multicast group.

It will be appreciated that any IP multicast routers that receive the IGMP reports on the Multicast VLAN 165 will be suitably configured to forward the IP multicast packets corresponding to the respective multicast group onto the Multicast VLAN 165. As a result, the parent AP 145 will receive all IP multicast packets for the IP Multicast Domain 180 on the single Multicast VLAN 165.

When an 802.11 station roams to a new parent access point, any multicast groups, where the station is a member, must be extended to the station's assigned IP multicast domain in the parent AP. In one embodiment, the parent AP may send an IGMP General Query message to the station to solicit the transmission of IGMP Membership Reports from the station. Any Membership Reports transmitted by the station are then relayed onto the designated Multicast VLAN for the station's Multicast Domain. In another embodiment, a context transfer protocol may be used to transfer group membership information for the station to the new parent AP; the parent AP may then generate IGMP Membership Reports, in proxy, for the station, on the designated Multicast VLAN for the station's assigned Multicast Domain.

In accordance with an example embodiment, the AP 145 may be suitably configured to create a separate set of broadcast group 802.11 encryption keys for each VLAN-based broadcast domain 165, 170, 175. Additionally, in accordance with the present innovation, the AP 145 may be suitably adapted to create a separate set of IP multicast group 802.11 encryption keys for each IP Multicast Domain 180.

As illustrated in FIG. 1, a parent AP 145 may be configured to deliver an IP multicast group key containing a first key ID, and a broadcast group key containing a second key ID, to each multicast domain associated client (e.g. 110, 115, 120, 125). It will be understood that the clients not associated with the Multicast Domain 180 (e.g. 130, 135) will only receive a broadcast group key and corresponding key ID.

The IP multicast group key may be used to encrypt/decrypt 802.11 frames that belong to the station's IP Multicast Domain 180. On the other hand, the broadcast group key may be used to encrypt/decrypt 802.11 frames that belong to the station's specific broadcast domain or VLAN (165, 170, 175). Of course it will be appreciated that the encryption keys may be established in the same manner as the encrypted keys are presently handled in accordance with the IEEE 802.11 standard.

The group key, or set of group keys, is different for each broadcast domain; however, the same broadcast Key ID may be used for multiple broadcast domains on the same access point. Likewise, the group key, or set of group keys, is different for each multicast domain; however, the same multicast Key ID may be used for multiple multicast domains on the same access point.

Continuing with the embodiment of FIG. 1, upon receipt of an Ethernet IP multicast frame via a multicast VLAN, a parent AP 145 may be configured to wirelessly transmit the frame to 802.11 stations (110, 115, 120, 125) in the corresponding IP Multicast Domain 180. The present system and method may be adapted to encrypt the frame utilizing the IP multicast group key for the domain.

Correspondingly, the IP multicast group key ID may be entered into the 802.11 header prior to transmitting the frame via the 802.11 link by the AP 145 to the wireless stations (e.g. 110, 115, 120, 125). Upon receipt, the 802.11 Multicast Domain 180 associated stations 110, 115, 120, 125 corresponding to the IP multicast group may be configured to use the received multicast group key ID to select the correct key in order to decrypt the frame. It will be appreciated that this multicast group key ID and corresponding cryptology may prohibit non-member stations (e.g. 130, 135) from decrypting the frame.

Of course, it will be appreciated that the IP multicast group key transmission may be configured to be protected by a message integrity check (MIC) or other information element which may be subject to authorization utilizing a known authentication protocol.

It will be appreciated that the parent AP 145 may be configured to discard any Ethernet IP multicast frames received on any VLAN that is not a designated Multicast VLAN. Of course, a parent AP 145 may be configured to transmit other Ethernet broadcast frames and non-IP multicast frames on 802.11 links encrypted with the broadcast group key for the VLAN-based broadcast domain in accordance with the IEEE 802.11 protocol.

It will be appreciated that the parent AP 145 may maintain group membership information for each Multicast Domain 180. A parent AP 145 may discard an Ethernet IP multicast frame received on a designated IP multicast VLAN (165) if there are no stations, in the corresponding multicast domain which are members of the multicast group identified by the destination IP multicast address in the frame.

Figure 2:
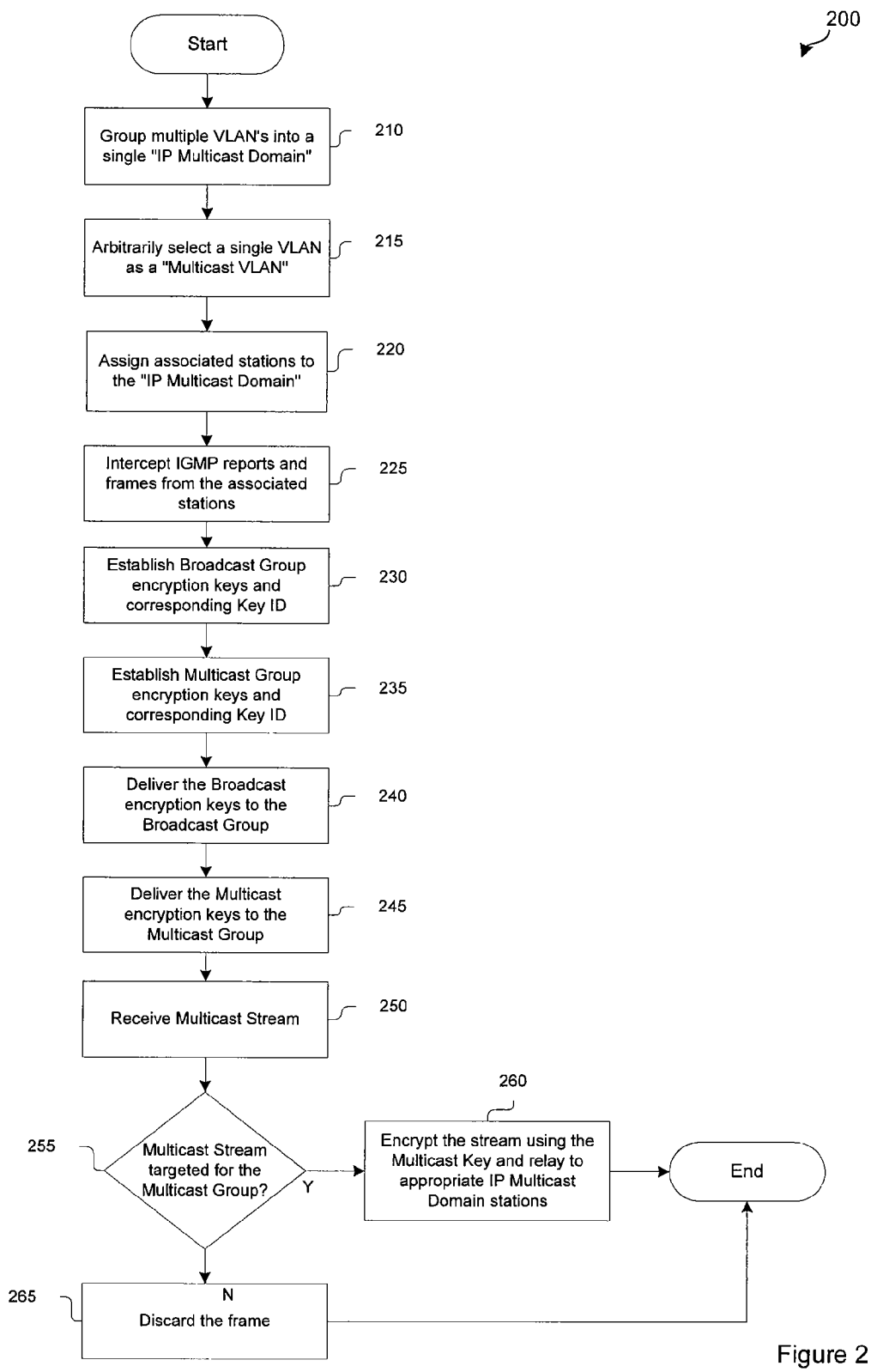
FIG. 2 illustrates a flow chart of the methodology outlining the information exchange between the various entities corresponding to a multicast transmission in accordance with an example embodiment.

Illustrated in FIG. 2 is an embodiment of a methodology 200 associated with the present system and method. Generally, FIG. 2 illustrates the process used to establish and group VLANs and unique keys in order to streamline and facilitate multicast transmissions via an 802.11 wireless network.

The illustrated elements denote "processing blocks" and represent computer software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. They may also be implemented using various programming approaches such as machine language, procedural, object oriented and/or artificial intelligence techniques. The foregoing applies to all methodologies described herein.

Referring now to FIG. 2, there is illustrated a flow chart of an example embodiment of a methodology 200 for grouping multiple VLANs into a single 802.11 IP Multicast Domain in order to streamline the transmission of IGMP reports. Methodology 200 infers the pre-establishment of a trusted relationship between all components of the system (e.g. wireless clients, AP, switch, AS).

Initially, at block 210, multiple VLANs may be grouped into a single "IP Multicast Domain." Next, a single VLAN included within the pre-defined "IP Multicast Domain" can be advantageously or arbitrarily selected as a "Multicast VLAN" (block 215). Once the Multicast VLAN is selected, associated wireless stations may be assigned to the IP Multicast Domain. (Block 220).

Next, IGMP reports from the IP Multicast Domain associated stations are intercepted (block 225). This interception prompts the redirection of the IGMP reports onto the Multicast VLAN for the particular station's IP Multicast Domain. It will be appreciated that the IGMP reports are used to establish group membership to an IP multicast group.

In order to provide security for transmissions, broadcast and multicast group encryption keys as well as corresponding key ID's may be established (blocks 230, 235). Once the keys are established, the keys may be delivered to the corresponding wireless clients in the broadcast and multicast groups (blocks 240, 245). It will be appreciated that multicast keys will only be transmitted to associated stations in the IP Multicast Domain.

Next, at block 250, a multicast stream is received on the designated IP multicast VLAN. At decision block 255, the system may determine if the multicast stream is targeted for a multicast group where at least one associated station is a member. If so, the frame may be encrypted using the previously delivered multicast key and relayed to the appropriate stations (block 265).

If at decision block 255 a determination is made that the frame is not targeted for the multicast group, the multicast stream may be discarded and ignored (block 260).

More than one IP multicast domain can be established on an access point. The process of grouping VLANs into an IP multicast domain, illustrated in FIG. 2, may be repeated for each IP multicast domain. A different set of one or more multicast keys may be used for each IP multicast domain.

While the system and method described herein has been illustrated by the description of example embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the appended claims.

What is claimed is:

1. An apparatus, comprising:
an access point configured to wirelessly communicate with a mobile node enabling the mobile node to communicate with an associated network;
wherein the access point is configured to group a plurality of virtual local area networks into a single multicast domain;
wherein the access point is configured to streamline delivery of multicast messages in the associated network by selecting a one of the plurality of virtual local area networks as a designated multicast virtual local area network for receiving and transmitting multicast messages of the single multicast domain;
wherein the access point is configured to deliver a multicast group key comprising a first key identification and a broadcast group key comprising a second key identification to each mobile node of the plurality of virtual area networks grouped in the single multicast domain;
wherein the multicast group key is selectively used by a mobile node to translate the multicast messages of the single multicast domain and the first key identification to identify the access point; and,
wherein the broadcast group key is selectively used by a mobile node to translate broadcast messages of a respective one of the plurality of virtual local area networks.

2. The apparatus of claim 1, wherein the access point is further configured to assign a mobile node belonging to one of the plurality of virtual area networks to the single multicast domain.

3. The apparatus of claim 2, further comprising:
the access point is configured to intercept an Internet Group Management Protocol (IGMP) report transmitted by the mobile node belonging to said one of the plurality of virtual local area networks; and
the access point is configured to relay the IGMP report onto the designated multicast virtual local area network for the single multicast domain.

4. The apparatus of claim 2, further comprising the access point is configured to relay a packet from the single multicast domain onto the designated multicast virtual local area network for the single multicast domain.

5. The apparatus of claim 2, further comprising the access point is configured to relay a packet from the designated multicast virtual local area network for the single multicast domain onto the single multicast domain.

6. The apparatus of claim 2, further comprising the access point is configured to discard a packet for one of the plurality of virtual local area networks that is not the designated multicast virtual local area network for the single multicast domain.

7. The apparatus of claim 1, wherein the access point is configured to establish, as the multicast group key, an encryption key for the multicast domain.

8. The apparatus of claim 7, wherein the access point is configured to securely forward the encryption key to the mobile node belonging to said one of the plurality of virtual local area networks.

9. The apparatus of claim 8, further comprising:
the access point is configured to assign, as the first key identification, a key identifier to the encryption key; and
the access point is configured to forward the key identifier to the mobile node belonging to said one of the plurality of virtual local area networks.

10. The apparatus of claim 9, further comprising:
the access point is configured to include the key identifier in data packets for the single multicast domain; and
the access point is configured to transmit data packets for the single multicast domain encrypted with the encryption key.

11. The apparatus of claim 1, wherein the multicast domain is an Internet Protocol (IP) multicast domain.

12. A method, comprising:
grouping a plurality of virtual local area networks comprising a plurality of mobile nodes into a single multicast domain;
assigning a mobile node belonging to one of the plurality of virtual local area networks to the single multicast domain;
delivering, by an access point, a multicast group key comprising a first key identification and a broadcast group key comprising a second key identification to the plurality of mobile nodes of the plurality of virtual area networks; and
forwarding a packet for one of the plurality of virtual local area networks onto the single multicast domain;
wherein the multicast group key is selectively used by the mobile nodes to translate multicast messages of the multicast domain and the first key identification to identify the access point; and,
wherein the broadcast group key is selectively used by the mobile nodes to translate broadcast messages of a respective one of the plurality of virtual local area networks.

13. The method of claim 12, further comprising designating a selected one of the plurality of virtual local area networks as a designated multicast virtual local area network for the single multicast domain.

14. The method of claim 13, further comprising:
intercepting an Internet Group Management Protocol (IGMP) report transmitted by the mobile node belonging to said one of the plurality of virtual local area networks; and
relaying the IGMP report onto the designated multicast virtual local area network for the single multicast domain.

15. The method of claim 13, further comprising relaying a packet from the single multicast domain onto the designated multicast virtual local area network for the single multicast domain.

16. The method of claim 13, further comprising relaying a packet from the designated multicast virtual local area network for the single multicast domain onto the single multicast domain.

17. The method of claim 13, further comprising discarding a packet received for one of the plurality of virtual local area networks that is not the designated multicast virtual local area network for the single multicast domain.

18. The method of claim 12, further comprising
establishing, as the multicast group key, an encryption key for the multicast domain;
securely forward the encryption key to the mobile node belonging to said one of the plurality of virtual local area networks; and
transmitting data packets for the single multicast domain encrypted with the encryption key.

19. The method of claim 18, further comprising:
assigning, as the first key identification, a key identifier to the encryption key; and
adding the key identifier to a header of a data packet.

20. The method of claim 12, wherein the multicast domain is an Internet Protocol (IP) multicast domain.

* * * * *